United States Patent [19]
Lewis, Sr. et al.

[11] Patent Number: 5,493,268
[45] Date of Patent: Feb. 20, 1996

[54] ANTI-CARJACKING SYSTEM

[76] Inventors: Robert J. Lewis, Sr., 1241 Roberts Rd., Warminster, Pa. 18974; Kim L. Burke, 2422 Greensward N., Warrington, Pa. 18976

[21] Appl. No.: 235,387

[22] Filed: Apr. 29, 1994

[51] Int. Cl.$^6$ ................................................ B60R 25/10
[52] U.S. Cl. ........................ 340/426; 340/428; 307/10.2; 180/287
[58] Field of Search ................................ 340/426, 428, 340/429, 430; 307/10.1, 10.2, 10.3, 10.4; 180/287

[56] References Cited

U.S. PATENT DOCUMENTS

| | | |
|---|---|---|
| 1,823,304 | 9/1931 | Weller . |
| 3,500,771 | 3/1970 | Fischer et al. . |
| 3,656,100 | 4/1972 | Beltrami .................................. 340/430 |
| 3,820,066 | 6/1974 | Kennell . |
| 4,062,303 | 12/1977 | Fegley . |
| 4,189,708 | 2/1980 | Bryll ..................................... 180/287 |
| 4,262,279 | 4/1981 | Dublirer ................................. 340/430 |
| 4,841,752 | 6/1989 | Fletcher . |
| 4,958,142 | 9/1990 | Sayers ................................... 340/426 |
| 5,051,723 | 9/1991 | Long et al. ............................. 340/429 |
| 5,172,093 | 12/1992 | Nose et al. ............................. 340/430 |
| 5,280,268 | 1/1994 | Matthews ............................... 340/426 |
| 5,298,878 | 3/1994 | Smith ..................................... 340/430 |
| 5,307,048 | 4/1994 | Sonders ................................. 340/426 |
| 5,315,286 | 5/1994 | Nolan ..................................... 340/430 |
| 5,318,147 | 6/1994 | Maiefski ................................ 180/287 |
| 5,389,911 | 2/1995 | Madau .................................... 340/426 |

*Primary Examiner*—Brent A. Swarthout
*Assistant Examiner*—Nina Tong
*Attorney, Agent, or Firm*—Howson and Howson

[57] ABSTRACT

Apparatus for use in thwarting an attempted hijacking of a vehicle utilizes a fluid chemical agent which irritates living human tissue upon contact. The fluid is contained in a reservoir, and is flowed under pressure to spray nozzles via tubes. The nozzles are located relative to the vehicle to spray the agent onto a hijacker so as to produce discomfort and disorientation. An automatic actuation system sprays fluid out of the nozzles when the system is enabled, the vehicle is running, and one of the vehicle's windows has been broken. Agent may also be sprayed by manually actuating an override switch into an energized position.

8 Claims, 6 Drawing Sheets

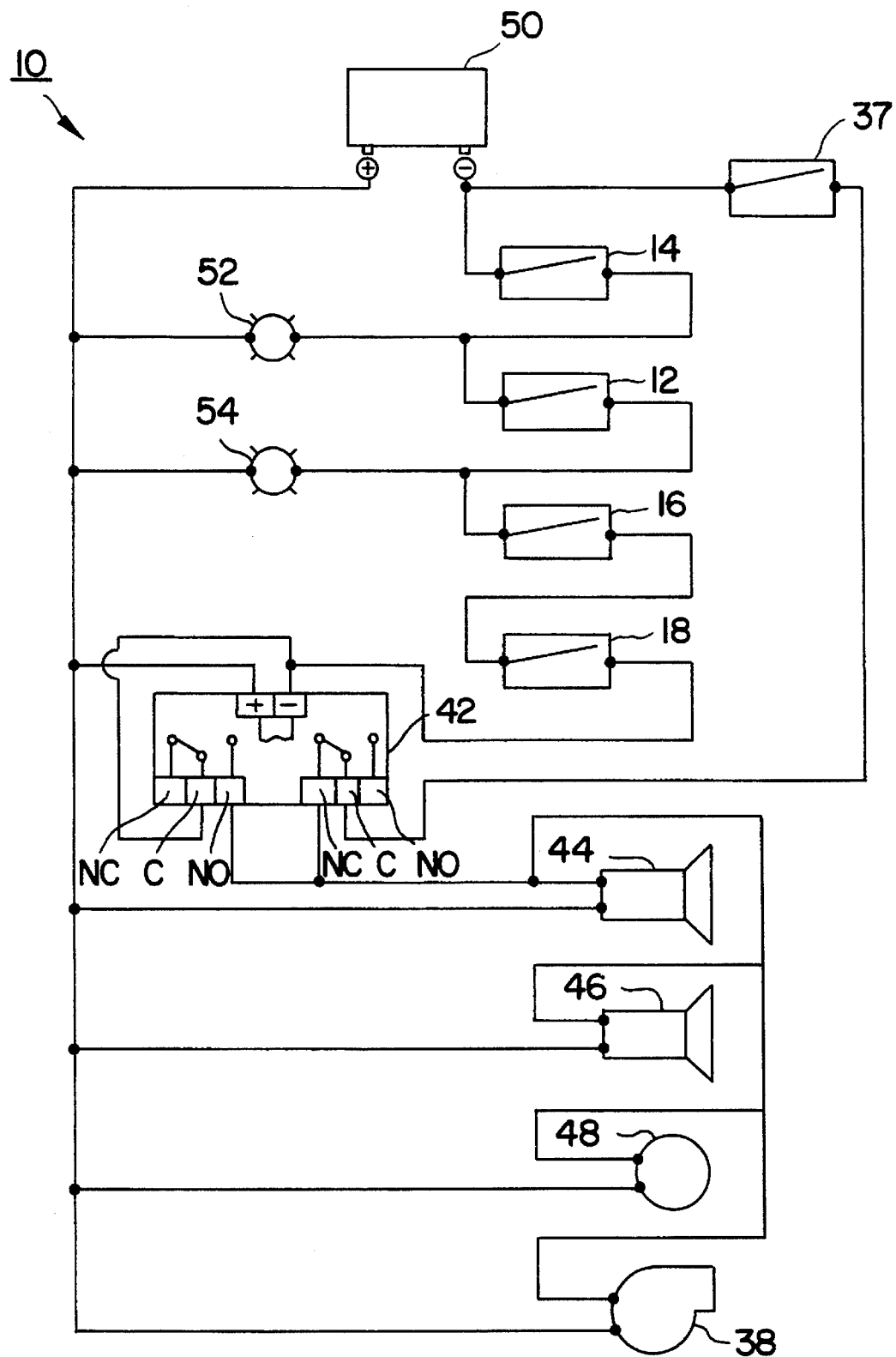
F I G. 9

5,493,268

ANTI-CARJACKING SYSTEM

FIELD OF THE INVENTION

This invention relates to vehicular security systems. It is specifically concerned with a system for thwarting an attempted hijacking of a vehicle.

BACKGROUND OF THE INVENTION

Hijacking is the physical theft of a vehicle when it is occupied by an operator or passenger. This crime is usually initiated by an assailant approaching a stopped vehicle, either secretly or under false pretenses. The assailant, by brandishing a weapon or through sheer physical force, proceeds to compel the occupant to relinquish control of the vehicle. The hijacking concludes with the assailant gaining possession of the vehicle, and may involve the abduction of occupants.

Privately owned cars and trucks are especially susceptible to this sort of aggressive criminal behavior, which has been popularly termed carjacking. Citizens typically fail to anticipate violent crimes, and are often unskilled in techniques effective in neutralizing these situations. These incidents also occur rather rapidly, giving the occupant little or no time to react.

Nearly all regions of the United States have reported an increase in the perpetration of violent crimes over the last few years. This general increase in aggressive criminal conduct, coupled with the proliferation of alarms for protecting unoccupied vehicles, has led to an epidemic of carjackings. A need has therefore arisen for a method of protecting the public from this crime.

BRIEF DESCRIPTION OF THE PRIOR ART

U.S. Pat. No. 1,823,304, to Weller, describes a device for discharging tear gas around the periphery of a vehicle. A switch is manually operated to simultaneously sound a horn and to energize a heat filament. The filament ignites a charge of black powder which punctures a pressurized canister of tear gas. This results in the uncontrolled discharge of the contents of the canister.

U.S. Pat. No. 3,500,771, to Fischer et al., describes a burglar-proof lock device having an elongated body connected to a gas cartridge containing tear gas, dye, or other deterrent. A spring biased firing pin is retained within the body in a spaced relationship from one end of the gas cartridge. Spring bias release means, operable from an extended tongue, release the firing pin when the enclosure guarded by the lock device is forced open. This release ruptures the cartridge and results in the uncontrolled discharge of the entire supply of tear gas.

U.S. Pat. No. 4,062,303, to Fegley, describes a fluid dispensing anti-burglar device. A pressurized container is movably mounted in the device between actuable and inactuable positions. Opening an associated door or window punctures the pressurized container when it is in the actuable position. This also results in the uncontrolled discharge of the entire contents of the container.

U.S. Pat. No. 4,841,752, to Fletcher, describes a device to deter the robbery of a store. The device has multiple nozzles positioned within an elongated deflection shield. The nozzles dispense a disabling fluid upon activation of a control valve by a manually operated foot pedal or similarly accessible secondary switch. An overhead bank of fluid dispensing nozzles may be utilized in addition to, or in lieu of, nozzles positioned at counter level.

U.S. Pat. No. 3,820,066, to Kennell, describes an alarm flasher for a vehicle. The flasher is energized when an inertial trigger is activated, and remains energized for a predetermined period of time. The trigger is activated following a time delay initiated by the manual actuation of a switch located on the dashboard. The flasher can only be disabled by using a special key.

OBJECTS OF THE INVENTION

With the foregoing in mind, the principal object of this invention is to provide a system for thwarting an attempted hijacking of a vehicle.

Another object of the invention is to provide an anti-hijacking system utilizing a safe, simple, strong, durable, and reliable actuation mechanism.

A further object of the invention is to provide an anti-hijacking system which is simple and inexpensive to manufacture and to install either as original equipment or as a retrofit.

SUMMARY OF THE INVENTION

More specifically, in accordance with the invention, the apparatus for thwarting an attempted hijacking of a vehicle utilizes a fluid chemical agent which irritates living human tissue upon contact. This fluid agent is contained in a reservoir, and is flowed to nozzles via tubes. The nozzles spray the agent at selected locations on the exterior of the vehicle. Discharging the agent in this manner into the face of a hijacker results in discomfort and disorientation, thereby deterring a hijacking attempt.

An automated actuation system is provided to automatically flow the fluid irritant to the nozzles under certain circumstances. It comprises a manually operated activation switch, an ignition switch, and a window switch. The activation switch is manually positioned to either arm or disarm the automated actuation system. When the system is armed, the fluid irritant is automatically flowed to the nozzles under certain conditions such as when the ignition switch detects that the vehicle engine is running, and the window switch detects that a window has been broken.

A manual actuation system is also provided for flowing the fluid irritant to the nozzles. It comprises an override switch having energized and de-energized positions. The fluid irritant is flowed to the nozzles when the override switch is actuated into the energized position.

The anti-hijacking apparatus in accordance with the invention provides a practical system for thwarting an attempted hijacking of a vehicle. The system affords effective protection for the occupants of the vehicle without endangering or permanently injuring a hijacker or bystanders. The apparatus utilizes a safe, simple, strong, durable, and reliable actuation mechanism. The anti-hijacking system is also simple and inexpensive to manufacture and to install.

BRIEF DESCRIPTION OF THE DRAWINGS

The foregoing and other objects, features, and advantages of the invention should become apparent from the following description when taken with the accompanying drawings, in which:

FIG. 9 is a schematic diagram of the wiring for the anti-carjacking system; and

DETAILED DESCRIPTION

Figure 1:
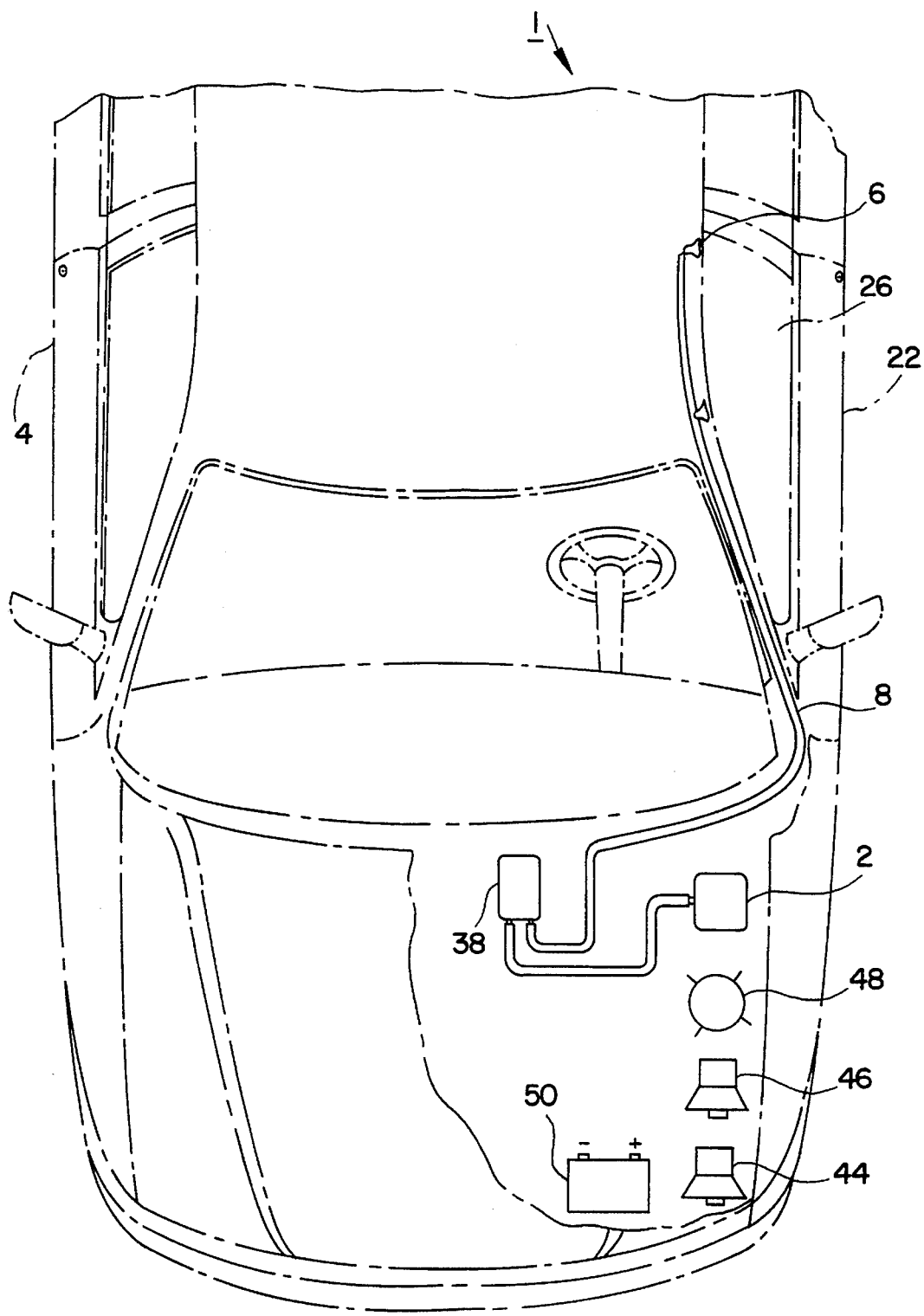
FIG. 1 is a partially broken away top plan view of the anti-carjacking system shown installed in a vehicle illustrated in phantom lines; and showing a reservoir, nozzles, tubing, a pump, a horn, and a battery.
Figure 2:
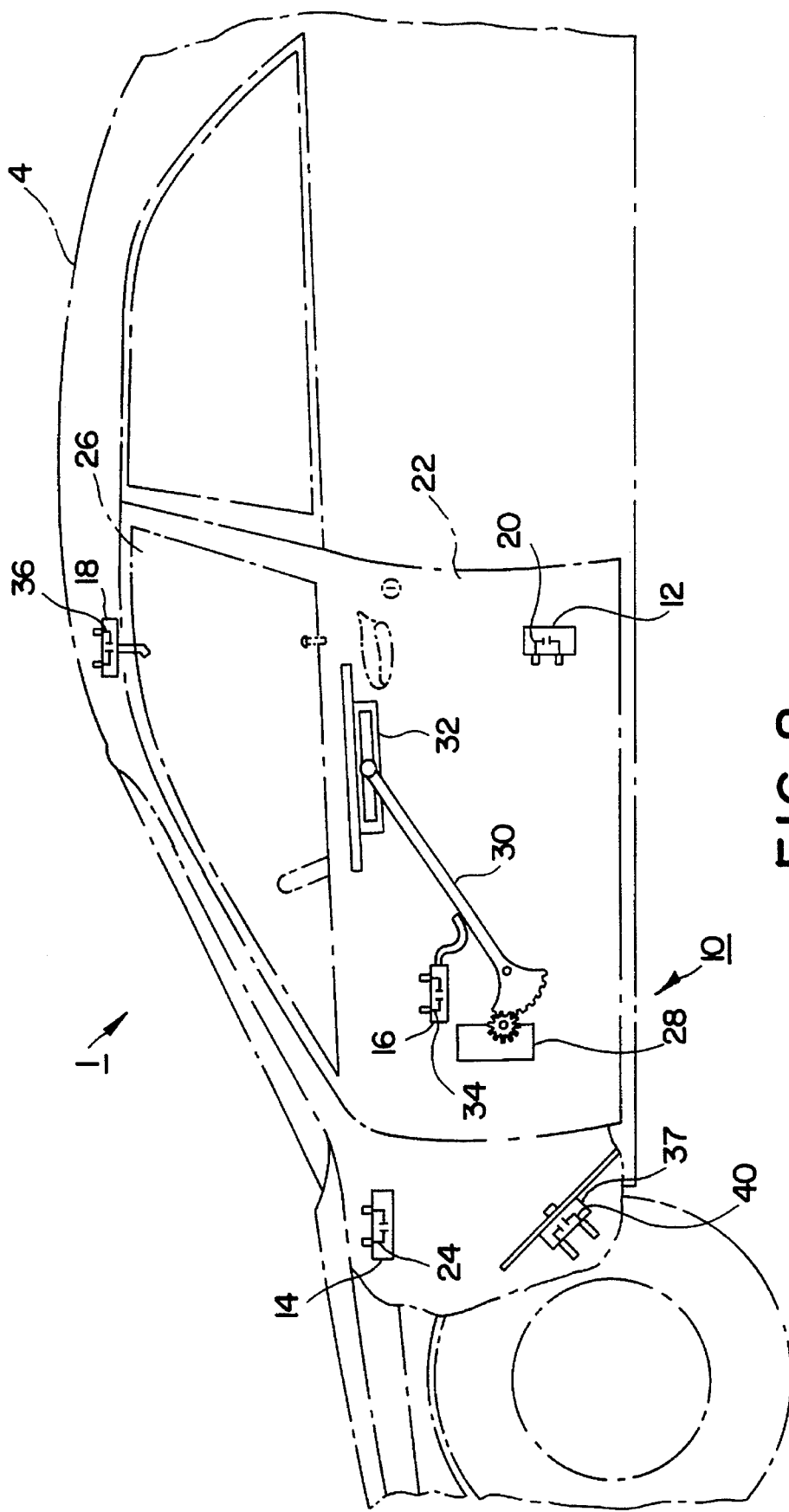
FIG. 2 is a partially broken away schematic elevational view of the anti-carjacking system illustrated in FIG. 1, as seen from the left side of FIG. 1, showing a manually operated activation switch, an ignition switch, window switches, and an override switch.

Referring now to the preferred embodiments, the anti-carjacking system 1 shown in FIGS. 1 and 2 comprises a reservoir 2 mounted in a vehicle 4. The reservoir 2 is preferably mounted at a location where it is protected from forces acting upon the exterior of the vehicle, i.e. is in a "crash-proof" location. The reservoir 2 contains a fluid chemical agent (not shown) which irritates living human tissue upon contact, causing stinging eyes, difficulty breathing, and disorientation. Pepper gas is preferably used because it is capable of disabling an individual for a period of time while producing no lasting ill effects. Other disabling substances that may also be used include tear gas and Mace®.

A plurality of nozzles 6 are mounted adjacent to the exterior of the vehicle 4 to spray the fluid received from the reservoir 2. The nozzles 6 are mounted on the vehicle 4 so as to spray the fluid into the face of an assailant attempting to forcibly enter the vehicle 4. FIG. 1 shows the nozzles 6 positioned to repel an assault upon the driver's side of the vehicle. The nozzles 6 may also be positioned to spray fluid at any location deemed to be effective for the purpose of repelling an attack.

The nozzles 6 are mounted in recesses (not shown) provided in the frame of the vehicle 4. This shields the nozzles 6 from the weather and objects colliding with the exterior of the vehicle. This also hinders an assailant from gleaning the location of the nozzles 6 for the purpose of surreptitiously plugging them up in an attempt to incapacitate the anti-carjacking system 1.

As shown in FIGS. 1 and 2, the fluid irritant is flowed from the reservoir 2 to the nozzles 6 via tubes 8. The tubes 8 are preferably mounted internally of the vehicle 4 to protect them from forces external to the vehicle 4. The tubes 8 may be manufactured from either rigid or pliable materials which are impervious to the fluid irritant.

An automated actuation system 10 shown in FIGS. 2 and 9, automatically initiates the flow of fluid irritant from the reservoir 2 to the nozzles 6 for spraying at selected locations at the exterior of the vehicle 4 under certain conditions. As best seen in FIG. 2, and as will be discussed in greater detail, the automated system 10 comprises a manually operated activation switch 12, an ignition switch 14, and a pair of window switches 16 and 18.

The manually operated activation switch 12 allows an operator or occupant of the vehicle 4 to either activate or deactivate the automated activation system 10 so that under certain circumstances, the fluid will be automatically flowed to the nozzles 6 when the automated system 10 is armed, or activated. The fluid will not be flowed to the nozzles 6 when the automated system 10 is disarmed or deactivated. An electric contact 20 within the activation switch 12 closes when the activation switch 12 is placed in the activated position.

The activation switch 12 is mounted in the interior of the vehicle 4 at a location which is easily accessible to the operator of the vehicle. The activation switch 12 is preferably so located as to be exclusively accessible to the operator of the vehicle, such as on the interior portion of the driver's door 22, as shown in FIG. 2. This precludes other occupants of the vehicle from tampering with the automated system 10.

The ignition arming switch 14 is preferably mounted under the hood in proximity with the ignition system (not shown). The ignition arming switch 14 is electrically connected to the ignition system so as to detect when the engine of the vehicle 4 is running. An electric contact 24 within the ignition switch 14 closes when the ignition switch 14 detects that the engine is running.

A means is provided to activate the system in the event of attempted forced entry into the vehicle. In the illustrated embodiment, this is effected by detecting breakage by one or more of the vehicle windows, preferably the driver's side window. To this end, a pair of window switches 16 and 18 (FIG. 2) cooperate to detect when the vehicle's window 26 has been broken. One way to achieve the desired result is to use the vehicular window drive mechanism 28. It includes an elongated lever arm 30 which either increases or decreases its angle when raising or lowering the window 26. The other end of the lever arm 30 is connected to a track 32 rigidly affixed to the frame of the window 26. When the drive mechanism rotates the lever arm 30 to raise the window, the lever arm 30 drives the window 26 upward and the angle between the lever arm 30 and the horizontal increases.

Window switch 16, mounted inside of the door panel, is connected to lever arm 30 and monitors the angular orientation of the lever arm 30. An electric contact 34 within window switch 16 closes when the lever arm 30 is oriented in its "window closed" position.

Window switch 18 is mounted in a position to determine when the window is closed. An electric contact 36 within window switch 18 closes when the window 36 is moved out of its fully closed position. Window switches 16 and 18 cooperate to determine that the window 26 has been broken which would exist if window switch 16 detects that the lever arm 30 is in its fully closed position at the same time window switch 18 does not detect that the window 26 is in the fully raised position. These conditions both prevent the system from being activated when the window is down, and they detect window breakage.

As illustrated in FIG. 9, the alarm actuation switch 12, ignition switch 14, and window switches 16 and 18 are wired in series to establish a single circuit. When the alarm activation switch 12 is actuated to activate the automated actuation system 10, ignition switch 14 detects that the vehicle 4 is running, window switch 16 detects that the lever arm 30 has been rotated to fully raise the window 26, and window switch 18 detects that the window 26 is not in the fully raised position, (as by having been broken), the circuit closes to allow electric current to pass for actuating flow control means to cause a volume of fluid irritant to flow from the reservoir 2 to the nozzles 6.

Figure 3:
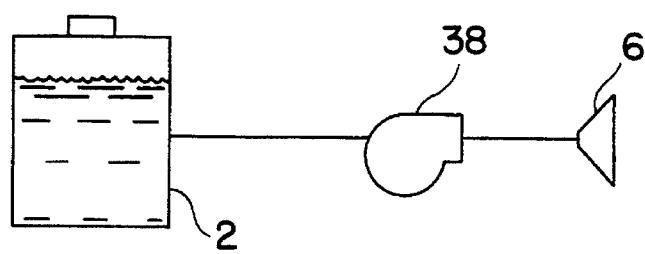
FIG. 3 is a schematic diagram of an embodiment of the anti-carjacking system showing a reservoir, a pump, and a nozzle, and the manner in which they are operatively interconnected.

In a preferred embodiment of the invention, as shown in FIG. 9, the current passed through the automated actuation system 10 is supplied to a pump 38. When the pump 38 is thereby energized, it draws fluid from the reservoir 2 and flows it to, and out of, the nozzles 6, as shown in FIGS. 1 and 3.

As shown in FIGS. 2 and 9, current may also by supplied to the pump 38 through a manual actuation system comprising an override switch 37. When the override switch 37 is manually actuated into the energized position, an electric contact 40 within switch 37 closes. This allows current to pass to the pump 38 for forcing the fluid irritant under pressure from the reservoir 2 to the nozzles 6. The override switch 37 is mounted at a location which is easily accessible to the operator of the vehicle 4.

An electric relay 42 isolates the automated actuation system from the manual actuation system. Relay 42 breaks the automated actuation system circuit when the override switch 37 is manually actuated into the energized position. Therefore, the automated actuation system cannot be activated when the manual actuation system is energized. This prevents current from being supplied to the pump 38 simultaneously from two sources, which would result in a short circuit.

In one preferred embodiment, as shown in FIGS. 1 and 9, current supplied to the pump 38 by either the automated actuation system or the manual actuation system is also transmitted to various signaling devices. This serves to further disorient an assailant and alert others in the vicinity of the carjacking. Different types of signaling devices may be used including horns 44, sirens 46, and pulsators 48.

Figure 10:
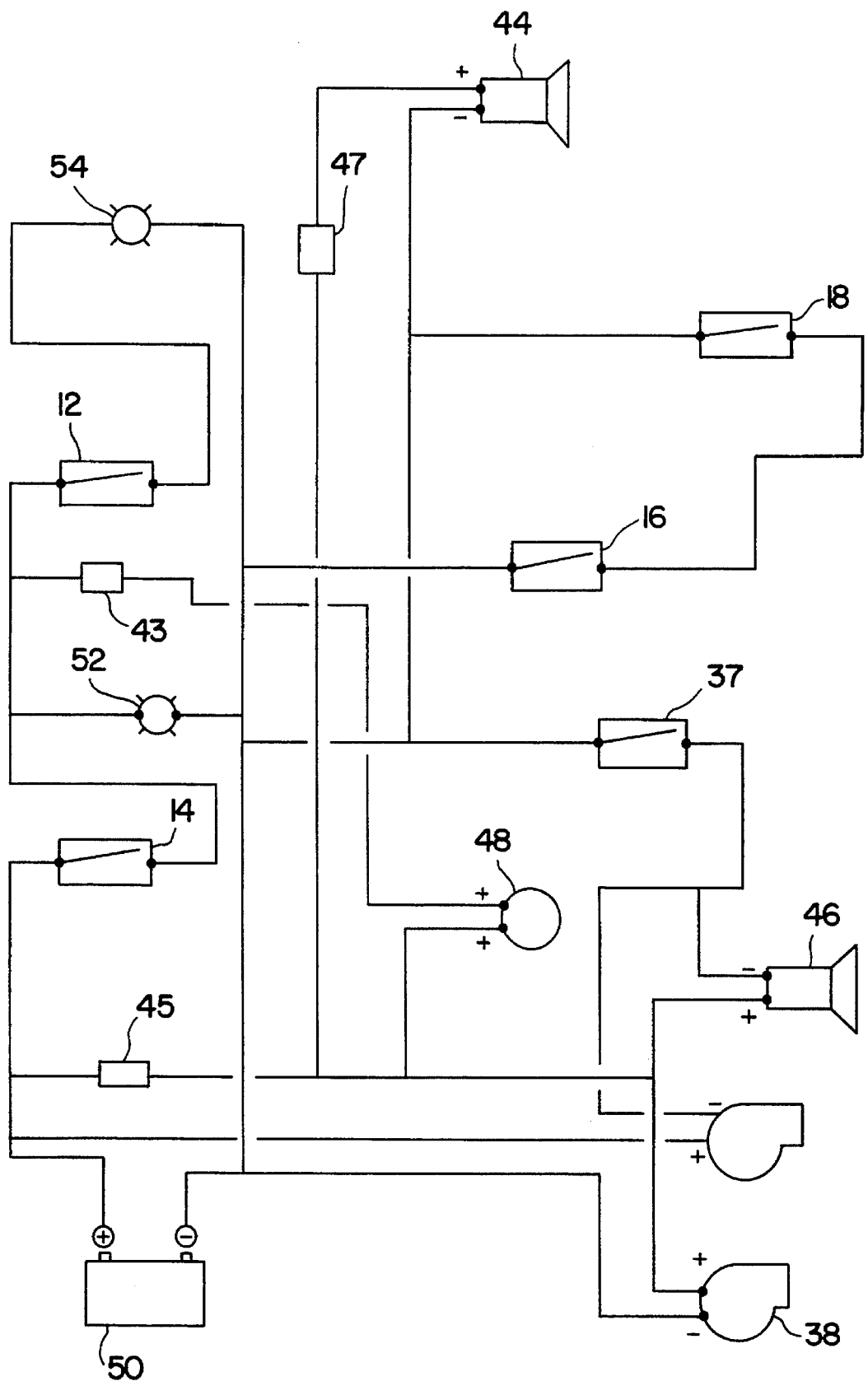
FIG. 10 is a schematic diagram of another embodiment of the wiring for the anti-carjacking system.

Preferably, as shown in FIGS. 1 and 9, power is supplied to the automated actuation system, and the manual actuation system, from a power source intrinsic to the operation of the vehicle 4, such as the car battery 50. Power may be supplied directly from the ignition system to only activate the system when the engine is running. The wiring schematic shown in FIG. 10 utilizing fuses 43, 45, and 47 may be used as an alternative to supplying power to the system in the manner shown in FIG. 9.

As shown in FIG. 9, the preferred embodiment uses pilot lights to indicate the status of various elements of the anti-carjacking system to the occupants of the vehicle. For example, a pilot light 52 indicates when the vehicle is running, and a second pilot light 54 indicates when the automated actuation system is activated.

In the first-mentioned embodiment, fluid under pressure is supplied in the system illustrated in FIG. 3. With this system, flow rate is limited to pump capacity, and there may be a slight time delay between pump activation and delivering of fluid to the nozzles.

Figure 7:
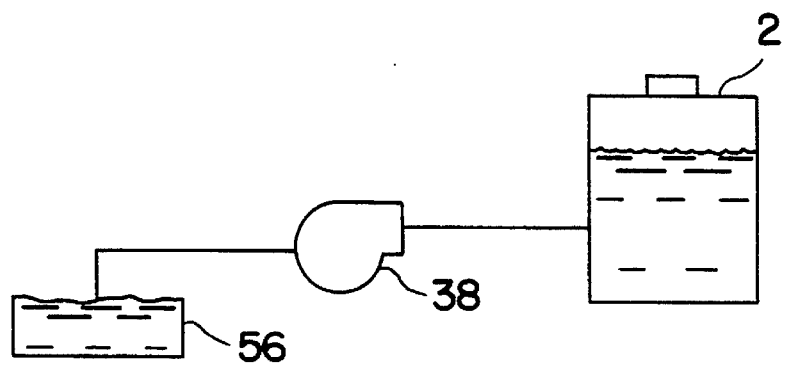
FIG. 7 is a schematic diagram of still further embodiment of the anti-carjacking system showing a reservoir, a pressure controller, a pump, and a second reservoir, and the manner in which they are operatively interconnected.

To enable a smaller capacity pump to be utilized, while delivering fluid at substantial volumes to the nozzles, other systems may be utilized. For example, as best seen in FIG. 7, the reservoir 2 may be used to contain a volume of fluid irritant under constant pressure. The fluid irritant is supplied to the reservoir 2 from a remote source of fluid 56 by pump 38.

Figure 4:
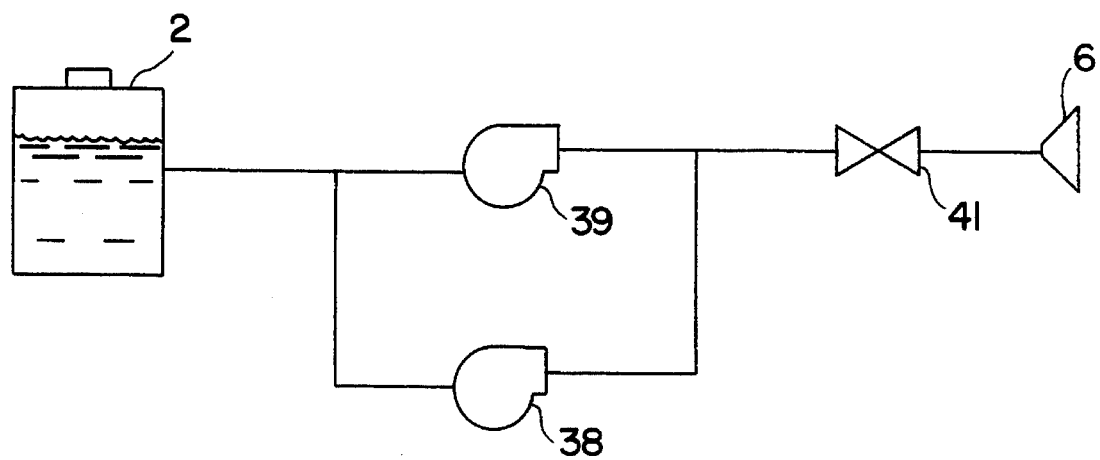
FIG. 4 is a schematic diagram of another embodiment of the anti-carjacking system showing a reservoir, two pumps, a nozzle, and a check valve, and the manner in which they are operatively interconnected.

To decrease the time delay between pump activation and delivery of fluid to the nozzles, two pumps 38 and 39, shown in FIG. 4, may be used concurrently with a check valve 41.

Figure 5:
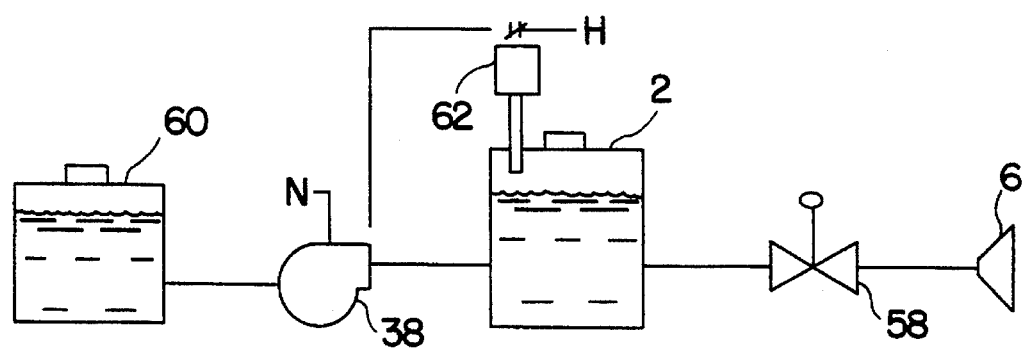
FIG. 5 is a schematic diagram of a further embodiment of the anti-carjacking system showing a nozzle, a control valve, a reservoir, a pressure controller, a pump, and a second reservoir, and the manner in which they are operatively interconnected.
Figure 6:
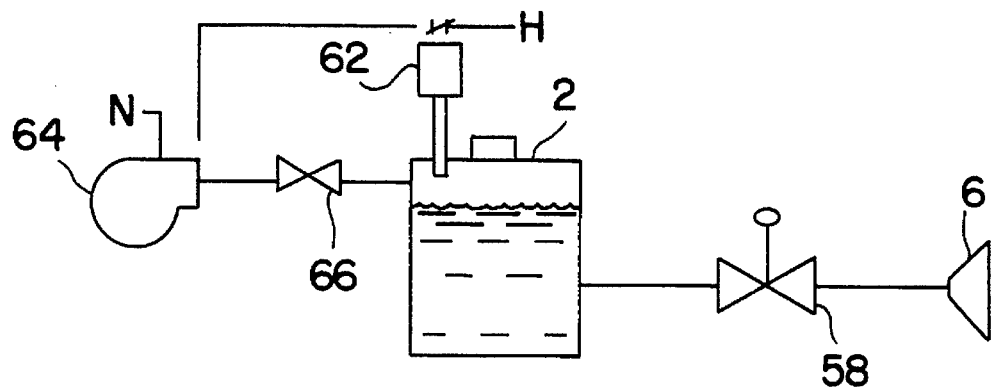
FIG. 6 is a schematic diagram yet another embodiment of the anti-carjacking system showing a nozzle, a control valve, a reservoir, a pressure controller, and a pump, and the manner in which they are operatively interconnected.
Figure 8:
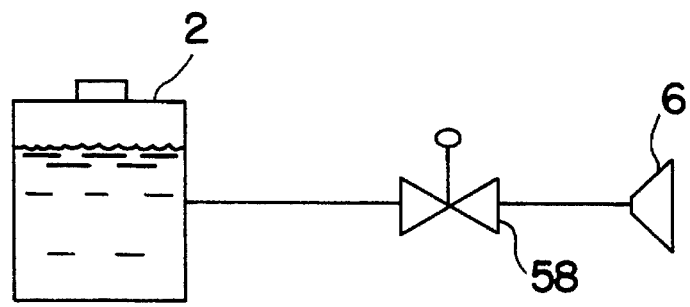
FIG. 8 is a schematic diagram of still another embodiment of the anti-carjacking system showing a reservoir, a control valve, and a nozzle, and the manner in which they are operatively interconnected.

As shown in FIGS. 5, 6, and 8, a solenoid valve 58 may be connected between the reservoir 2 and the nozzles 6, instead of pump 38, to release fluid under pressure quickly. The current supplied to the pump 38 either by the automated actuation system or by the manual actuation system in the preferred embodiment, may energize the solenoid valve 58 to allow fluid to flow to the nozzles 6. The reservoir 2 may be removed when all of the fluid is used up, and replacement reservoirs 2 may be supplied to the user in the form of modules to easily snap into place on the vehicle 4.

As shown in FIG. 5, a second reservoir 60 containing fluid may be used to maintain a supply of pressurized agent within the primary reservoir 2. In this system a pressure switch 62 energizes pump 38 upon sensing a decreased pressure within reservoir 2 to flow fluid irritant from the second reservoir 60 to the primary reservoir 2. Pressure switch 62 deenergizes the pump 38 upon sensing a sufficient pressure within the primary reservoir 2. This pressurizing scheme, shown in FIG. 5, utilizes air pressure in the reservoir head space above the liquid, and prevents the system from becoming inoperable due to minor pressure leaks which may develop over extended periods of time, and provides an additional supply of agent to be sprayed by the nozzles 6.

Pressure within the reservoir 2 may also be maintained by air derived from the air pump 64 associated with the engine emissions control system and fed via an air valve 66. The pressure switch 62 energizes engine air pump 64 upon sensing a decreased pressure within the reservoir 2. The air pump 64 pumps air into the reservoir 2 to increase the pressure therein. The pressure switch 62 deenergizes the air pump 64 upon sensing a sufficient pressure within the reservoir 2.

The manual actuation system shown in FIGS. 2 and 9 may also utilize a wireless transmitter and receiver (not shown). An operator may thereby transmit a signal from a location outside of the vehicle to a receiver mounted on the vehicle. The receiver closes a contact, wired in the same manner as contact 40 within switch 37 shown in FIG. 9, which allows current to pass to the pump 38 for forcing the fluid irritant under pressure from the reservoir 2 to the nozzles 6.

The anti-carjacking system may be automatically activated by a different set of circumstances than those previously described. For example, when a vehicle is stationary, in gear, the doors are locked, and the operator is utilizing a seat belt, as is often the case at a stop-sign or light; the system may be set up to automatically activate when the vehicle is switched out of gear at the same time the seat belt is released.

The herein described method of thwarting an attempted carjacking admixes chemical agent with ambient air around the exterior of the vehicle in much the same manner as a skunk sprays a potential aggressor with its malodorous secretion. The effects of contact with the chemical agent, however, extend beyond a mere assault upon the olfactory glands, and in fact result in temporary disablement.

The anti-hijacking apparatus affords effective protection for the occupants of the vehicle without endangering or permanently injuring a hijacker or bystanders. The apparatus utilizes a safe, simple, strong, durable, and reliable actuation mechanism. The anti-hijacking system is also simple and inexpensive to manufacture and to install.

While preferred embodiments of the invention have been described in detail, still other modifications, which will occur to persons skilled in the art, may be made without departing from the scope of the invention as defined in the following claims.

We claim:

1. An apparatus for use in thwarting an attempted hijacking of a vehicle having an interior, an exterior, and at least one window, comprising:

a reservoir carried by the vehicle for containing a fluid chemical agent which irritates living human tissue upon contact;

at least one nozzle mounted on the vehicle for spraying the fluid chemical agent in the vicinity of the exterior of the vehicle;

means for flowing the fluid under pressure from the reservoir to said at least one nozzle; and means for automatically actuating said fluid flowing means immediately in response to at least one predetermined condition;

wherein the means for automatically actuating said fluid flowing means comprises a manually operated activation switch having on and off positions electrically connected to an ignition switch, and sensor means for detecting that said at least one window has been broken, whereby the fluid is flowed to the nozzle immediately when the activation switch has been actuated into the on position, the ignition switch detects that the vehicle is energized, and the sensor means detects that said at least one window has been broken.

2. Apparatus for use in thwarting an attempted hijacking of a vehicle according to claim 1 further comprising manual actuation means having an override switch with on and off positions, whereby the fluid is flowed to the nozzle when the override switch is manually actuated into the on position.

3. Apparatus for use in thwarting an attempted hijacking of a vehicle according to claim 2 including a plurality of nozzles disposed at preselected locations around the exterior of the vehicle.

4. Apparatus for use in thwarting an attempted hijacking of a vehicle according to claim 3 further comprising alarm means for sensibly indicating that fluid is being flowed to the nozzle.

5. Apparatus for use in thwarting an attempted hijacking of a vehicle according to claim 4 further comprising display means within the interior of the vehicle for indicating the status of said means for automatically actuating said fluid flowing means.

6. Apparatus for use in thwarting an attempted hijacking of a vehicle according to claim 5 wherein a power source intrinsic to the operation of the vehicle provides the power requirements of said apparatus.

7. Apparatus for use in thwarting an attempted hijacking of a vehicle according to claim 6 further comprising relay means for automatically disabling the manual actuation means when the activation switch has been manually actuated into the on position, the ignition switch detects that the vehicle is energized, and the window sensor switch detects that said at least one window has been broken.

8. Apparatus for use in thwarting an attempted hijacking of a vehicle having an interior, an exterior, and at least one window, comprising:

a reservoir carried by the vehicle for containing a fluid chemical agent which irritates living human tissue upon contact;

at least one nozzle mounted on the vehicle for spraying the fluid chemical agent in the vicinity of the exterior of the vehicle;

means for flowing the fluid under pressure from the reservoir to the nozzle, said means comprising a control valve and tubing, said tubing connecting said control valve to the reservoir and to said at least one nozzle;

means for automatically actuating said fluid flowing means immediately in response to at least one predetermined condition, said automatic means comprising a manually operated activation switch having on and off positions electrically connected to an ignition switch, and sensor means for detecting that said at least one window has been broken, whereby the fluid is flowed immediately to the nozzle when the activation switch has been actuated into the on position, the ignition switch detects that the vehicle is energized, and the sensor means detects that said at least one window has been broken; and manual actuation means having an override switch with on and off positions, whereby the fluid is flowed to the nozzle when the override switch is manually actuated into the on position.

* * * * *